US006309615B1

(12) United States Patent
Hollitt et al.

(10) Patent No.: US 6,309,615 B1
(45) Date of Patent: Oct. 30, 2001

(54) PROCESS FOR REMOVING REACTIVE SILICA FROM A BAYER PROCESS FEEDSTOCK

(75) Inventors: Michael John Hollitt, Graceville; Anthony John Crisp, Toowong; Warren Scott Staker, Thomastown; Gerard Marcus Roe, Preston; Darren Paul Rodda, Greensborough, all of (AU)

(73) Assignee: Comalco Aluminum Limited, Victoria (AU)

( * ) Notice: Subject to any disclaimer, the term of this patent is extended or adjusted under 35 U.S.C. 154(b) by 0 days.

(21) Appl. No.: 09/297,097
(22) PCT Filed: Nov. 20, 1997
(86) PCT No.: PCT/AU97/00786
§ 371 Date: Oct. 15, 1999
§ 102(e) Date: Oct. 15, 1999
(87) PCT Pub. No.: WO98/22390
PCT Pub. Date: May 28, 1998

(30) Foreign Application Priority Data

Nov. 20, 1996 (AU) .................................................. PO3672

(51) Int. Cl.⁷ ............................... C01B 33/26; C01F 1/00
(52) U.S. Cl. .................... 423/118.1; 423/121; 423/625
(58) Field of Search ............................ 423/121, 118.1, 423/625

(56) References Cited

U.S. PATENT DOCUMENTS

| | | | |
|---|---|---|---|
| 3,413,087 | * 11/1968 | Roberts | 423/118.1 |
| 4,426,363 | * 1/1984 | Yamada et al. | 423/121 |
| 4,455,284 | * 6/1984 | Sizyakov et al. | 423/121 |
| 4,468,375 | * 8/1984 | Misra | 423/122 |
| 4,483,830 | * 11/1984 | Cresswell et al. | 423/121 |
| 4,647,439 | * 3/1987 | Lepetit | 423/121 |
| 4,661,328 | 4/1987 | Grubbs . | |
| 4,994,244 | * 2/1991 | Fulford et al. | 423/121 |

FOREIGN PATENT DOCUMENTS

2175580 * 12/1986 (GB) .................................... 423/121

OTHER PUBLICATIONS

Medvedkov et al, "Desiliconization of Kazakhstan Bauxites," Complex Utilization of Mineral Raw Materials, (1983) (12) pp. 37–40 with Translation, no month.

Eremin, "Beneficiation of Low–Grade Bauxites by Hydrometallurgical Methods," Proc. Alumina Production until 2000, Tihany, Hungary, Oct. 6–9, 1981, pp. 135–142.

Faneitte et al, "Predesilication of Pijiguaos Bauxite," Proc. Light Metals 1990, Feb. 18–22, 1990, Anaheim.

* cited by examiner

Primary Examiner—Steven Bos
(74) Attorney, Agent, or Firm—Dennison. Scheiner, Schultz & Wakeman

(57) ABSTRACT

A process for the removal of reactive silica from a feedstock to the digestion step of the Bayer process for the manufacture of alumina, in which (a) the feedstock is contacted with a caustic liquor under process conditions which result in dissolving and stabilizing at least 50% of the silica into solution at a level of at least 3 gpL and without significant precipitation from solution of dissolved silica, (b) the silica bearing liquor is separated from solid residue of step (a) under conditions which do not promote significant precipitation of the silica; and (c) aluminosilicates are precipitated from the separated silica bearing liquor from step (b), to form a solid aluminosilicate product which is free of a majority of all other components of the feedstock.

17 Claims, 3 Drawing Sheets

PROCESS FOR REMOVING REACTIVE SILICA FROM A BAYER PROCESS FEEDSTOCK

BACKGROUND OF THE INVENTION

Bauxite is the major source of aluminium containing ore used in the production of alumina. Bauxite contains hydrated forms of aluminium oxide (alumina) that occur in several different structural forms, depending upon the number of molecules of water of hydration and the crystalline form. Most commercially useful deposits of bauxite include gibbsite (alumina trihydrate) and/or boehmite (alumina monohydrate) and/or diaspore.

Alumina is extracted from bauxite by use of the Bayer process. Briefly, the Bayer process includes the steps of contacting bauxite with a hot caustic solution to dissolve alumina therefrom. If the bauxite contains mainly gibbsite, extraction of alumina from the bauxite may be conducted using a caustic solution at a temperature generally in the range of 100 to 150° C. If the bauxite contains mainly boehmite, or diaspore higher temperatures, in the order of 200 to 300° C. are generally required. For mixed bauxites containing both gibbsite and boehmite, a double digestion process may be used.

After digestion, the bauxite/caustic solution mixture is separated into a pregnant liquor containing dissolved alumina (usually in the form of sodium aluminate) and a solids residue (usually referred to as red mud). The pregnant liquor is fed to a precipitation circuit where it is cooled and seeded with solid particles of alumina trihydrate to induce precipitation of alumina trihydrate from the pregnant liquor. The resulting precipitation slurry is separated into a spent liquor stream and a solids stream. Coarse solids represent product and are transferred to a calcination stage where they are calcined to produce alumina. Fine solids are returned as seed particles to the precipitation circuit. The spent liquor is returned to the digestion step where it is contacted with further bauxite. Between the digestion and precipitation steps, there is generally one or more washing steps and the spent liquor generally must be evaporated to obtain the required caustic concentration prior to being returned to the digestion step. The Bayer process has been used commercially for about 100 years and it is well known to persons of skill in the art.

Bauxite, in addition to containing hydrated forms of alumina, includes several impurities. The main impurities are compounds of iron, titanium and silica. The compounds of iron and titanium found in bauxite generally are insoluble in caustic solutions and have little effect on the selective extraction of alumina from bauxite. These compounds report to the red mud following digestion.

The silicon compounds present in bauxite occur mainly as quartz and as hydrated double salts with alumina, such as kaolin. Quartz dissolves slowly in caustic solutions and the other forms of silica in the bauxite may dissolve rapidly in the caustic solutions used in the digestion step. Accordingly, bauxites containing significant amounts of silica have the potential to be difficult to treat.

The presence of silica in bauxite can cause at least two major problems in the digestion of bauxite, these being:

(i) dissolution and reprecipitation of silica as complex sodium alumino-silicates, thereby consuming caustic soda; and (ii) reprecipitation of complex sodium alumino-silicates on plant surfaces, thereby causing scale build-up. This problem is especially severe when scale builds up on heat exchange surfaces.

Prior art attempts to deal with problems associated with silica in bauxite have concentrated on either suppressing silica dissolution or completing precipitation of silica in a controlled step to minimise scaling throughout the remainder of the plant. The problems of caustic soda consumption and scaling of plant surfaces are largely independent of each other—a low silica bauxite will result in low caustic soda losses but can drive significant scaling problems while a high silica bauxite will consume large quantities of caustic soda but will result in less scaling. It is for this reason that most of the prior art dealing with the impact of silica on the Bayer process deals with only one aspect of the problem. The prior art can be grouped broadly into four areas, as discussed below:

1) Predaesilication

A significant number of refineries include a so-called predesilication operation prior to digestion where the bauxite is held at a temperature of around 100° C. for 6–18 hours. The purpose of this operation is to convert a large portion of the reactive silica to sodalite type sodium alumino-silicate which will then act as seed to rapidly convert the remaining reactive silica to sodalite type sodium alumino-silicate during digestion. The conditions under which predesilication is conducted, low caustic and alumina concentration, ensure that only a very small proportion of the total reactive silica is in solution at any given time. The primary purpose of predesilication is to ensure that conversion of reactive silica to sodalite type sodium alumino-silicate is complete so that pregnant liquor from digestion contains a minimum amount of dissolved silica which in turn minimises alumina product contamination and sodium alumino-silicate scaling during subsequent reheating of spent liquor. This operation has no impact on the amount of caustic soda consumed as a result of silica reaction. Sodium alumino-silicates are usually discarded from the Bayer plant as a component of red mud. However, a separate sodium alumino-silicate precipitation step after predesilication has been proposed.

U.S. Pat. No. 3,413,087 in the name of Roberts, assigned to Reynolds Metals Company, describes a Bayer process for extracting alumina from bauxite which includes a predesilication step to dissolve silica prior to digestion. In the predesilication step, the bauxite is mixed with spent liquor or strong liquor containing make-up caustic. The quantity of caustic present in the liquor is insufficient to dissolve all of the soluble alumina in the bauxite but is sufficient to dissolve substantially all of the soluble silica in the bauxite. However, only a small fraction of the soluble silica is in solution at any time. The slurry (of bauxite and liquor) is maintained in the predesilication stage (called a predigestion stage in the patent) at a temperature of from 150° F. to the temperature used in the digestion step for a period of time (e.g. 30 minutes to 12 hours) to allow the dissolved silica to crystallize and precipitate as a complex sodium aluminium silicate desilication product. The patent states that crystallization of desilication product (DSP) causes the dissolved silica to preferentially precipitate on the DSP particles, rather than on other surfaces such as heat exchange surfaces. The turbulence of the slurry in the digestion system can also act to maintain clean heat exchange surfaces. The DSP is insoluble and allows the slurry to pass to the digestion stage without scaling of heat exchange surfaces occurring. After digestion, the DSP is removed in the red mud residues.

A paper by Eremin, from the USSR Institute of Mining, Leningrad, entitled "Beneficiation of Low Grade Bauxite by Hydrometallurgical Methods" (in: Proc. Conference; Alumina Production until 2000, Tihany, Hungary, Oct. 6–9, 1981, p. 135–142.) discloses studies into the dissolution of silica components from bauxite. Following these studies, the paper concluded that bauxite desilication should be carried out at approximately 80 to 90° C. at a high liquid to solids ratio and with medium caustic concentrations (100 to 150 g/l $Na_2O$, which corresponds to 170 to 260 g/l, calculated as $Na_2CO_3$). This paper makes reference to a treatment step in which a portion of the reactive silica is dissolved before Bayer process digestion. The reactive silica which enters solution is subsequently precipitated to produce a separable aluminosilicate material. However, this paper highlighted a major limitation in carrying out the process, since stable silica levels in solution never exceeded those expected in recycled Bayer liquors by more than about 2.5 gpL, limiting the effectiveness of silica dissolution at realistic liquor to bauxite ratios for bauxites having high silica contents. Thus in the best tests reported by Bremin only about 50% of the reactive silica was removed. For this reason Eremin proposed the use of a bauxite precalcination step to activate the silica and deactivate the alumina in the bauxite to a degree so that better selectivity could be obtained.

2) Low Temperature Digestion

A number of processes have been disclosed which aim to reduce dissolution of reactive silica. These processes are based on a low temperature digestion of bauxite where the very short residence time is just sufficient to extract alumina but insufficient to completely convert reactive silica to DSP. The temperatures required for alumina extraction is such that the desilication reaction still proceeds very rapidly so that it is not practically possible to achieve a solid-liquid separation for the purposes of substantial silica removal from the solid residue when the silica content of the liquor is at its highest. In order to minimise silica conversion to DSP or dissolution it is necessary to limit the digestion temperature to a maximum of 150° C. meaning that this process is only suitable for gibbsitic bauxites. Only limited reduction in caustic consumption is achieved through reduced silica dissolution. Pregnant liquor must be separately desilicated after mud separation as it contains a high level of silica (typically 2–3 g/l).

U.S. Pat. No. 4,661,328 in the name of Grubbs, assigned to Aluminium Company of America, describes a process for purifying an alumina rich ore containing more than 5 weight percent reactive silica. The process includes the steps of mixing the ore with an aqueous digestion solution of silica and sodium aluminate and digesting the mixture at a temperature of 80 to 150° C. to dissolve alumina whilst inhibiting the dissolution of reactive silica from the ore. The bauxite may be mixed with an aqueous digestion solution that is nearly saturated with silica and nearly saturated with alumina. In this process, the high silica ore is mixed with an aqueous digestion solution having high alumina, high silica and high soda in solution. The silica is present in the digestion solution at a concentration of greater than 1.8 g/l, typically 1.8 to 2.5 g/l. A post desilication process, seeded by desilication product, is required. Alumina may be present in the solution in an amount of from 150 to 170 g/l while soda values in the solution typically fall within the range of 240 to 300 g/l, calculated as $Na_2CO_3$. The temperatures in the digestion step are lower than in conventional Bayer process temperatures and they typically fall within the range of 80 to 150° C., most preferably 100 to 120° C. This process retards or avoids the dissolution of silica from bauxite. The process can only be used with gibbsitic bauxite as the digestion temperatures utilised in this process are too low to viably digest boehmite containing bauxites.

U.S. Pat. No. 3,716,617 in the name of Oku et al, assigned to Sumitomo Chemical Co Limited, relates to a bauxite digestion process in which a digestion residue comprising solid components in a slurry that has not been subjected to a desilication treatment is separated by use of a synthetic organic high molecular weight flocculent from a sodium aluminate liquor resulting from bauxite digestion. The separation is conducted whilst at least 5% of the reactive silica remains unconverted to DSP in the solid residue. In the digestion step of this patent, the soda content may fall within the range of 80 to 200 g/l. The temperature is preferably 90 to 150° C. The process is based upon operating the digestion step to reduce the amount of reactive silica dissolved from the bauxite. The combination of temperature and residence time in the process is chosen to minimise silica dissolution. Typical operating parameters for the digestion step include operating at a temperature of 110° C. for ten minutes, or operating at 140° C. for 60 seconds. The process described in Oku et al avoids complete silica dissolution or conversion to DSP during bauxite digestion.

Japanese Patent Application No. Sho 62-230613 discloses a process for extracting alumina from reactive bauxite in which the temperature and residence time are controlled to obtain substantially complete alumina dissolution, but only a small amount of the silica in the bauxite is extracted into solution or converted to DSP. After the required digestion time, the digestion slurry is rapidly cooled to quench the silica dissolution reaction. This process relies upon the differences in the rates of dissolution of alumina and silica to minimise the amount of silica extracted into solution or converted to DSP. Any silica that does go into solution is removed by seeding with sodalite to promote sodium alumino-silicate precipitation.

WO 93/20251 in the name of Sumitomo Chemical Company, Limited discloses a bauxite digestion process in which bauxite and an alkaline solution are mixed to form a slurry. The slurry is fed to an extractor and alumina is extracted whilst dissolution of reactive silica is suppressed. The solid residue is separated from the liquor without any of the reactive silica dissolved in the liquor being precipitated as a sodium alumino-silicate. The operating conditions in the extractor include an $Na_2O$ content in solution of 100 to 160 g/l, a temperature of 110 to 160° C. and a residence time of up to 10 minutes. As alumina is extracted from the bauxite, the liquor fed to the extractor must have a relatively low dissolved alumina content. In the extractor, the extraction of reactive silica does not exceed more than 70%, preferably not more than 5 by weight. The re d mud recovered from the digestion step contains a substantially reduced amount of sodium alumino-silicate. The liquor recovered from the digestion step contains only a limited amount of the original silica in the bauxite, and it is desilicated by adding a solid silicate material as seed to form insoluble silicate materials, such as sodalite or zeolite. Prevention of sodium alumino-silicate precipitation in the extractor is achieved by using a short residence time in the extractor.

U.S. Pat. No. 5,122,349 discloses a gibbsitic bauxite digestion process in which the gibbsite is rapidly dissolved to reduce the free hydroxide concentration. This leads to a reduced kaolinite dissolution. This process is only applicable to gibbsitic bauxites.

3) Double Digestion

Double digestion is a process designed for mixed, gibbsitic/boehmitic bauxites which allows boehmite to be extracted at a lower temperature than required in a normal high temperature plant. The effect of this is that dissolution of a portion of the silica in the form of quartz can be reduced.

However, quartz usually only accounts for a small proportion of the total reactive silica in bauxite. Conversion of silica in kaolinite to DSP cannot be avoided in a double digestion process if the bauxite is handled as a single stream. However, in the unusual case that bauxite can be beneficiated to give gibbsite/kaolinite and boehmite fractions, caustic consumption can be reduced in the low temperature digestion. The separation of some silica (or sodium aluminosilicate) is possible after the low temperature digestion stage by keeping the temperature and residence time to a minimum and then desilicating the pregnant liquor after mud separation.

U.S. Pat. No. 4,994,244 in the name of Fulford et al, assigned to Alcan International Limited, relates mainly to a digestion process that separates red mud from liquor in a pressurised vessel. However, a side benefit from the process described in Fulford is that it is possible to limit the residence time of the bauxite in the digestion step to that time actually required for extraction of alumina from the bauxite. According to Fulford et al, conventional digestion processes carry out a significant part of the liquor desilication operation inside the pressure digester. As the liquor desilication reaction is relatively slow, the liquor desilication reaction typically controls the residence time required in the digester. With the process of Fulford et al, little or no liquor desilication occurs in the digester and a seeded, controlled desilication of the liquor can be carried out after the pressurised red mud separation step. This is, of course, a post desilication reaction. It is noted that one variant of the Fulford et al process (FIG. 6 in U.S. Pat. No. 4,994,244) utilises a double digestion step with desilication occurring in the digester used for gibbsitic digestion. The patent does not specify the properties of the caustic liquor used in the digestion, except to say that typical liquors for Bayer process digestion are used. The short residence time for digestion disclosed in Fulford et al allows the removal of the already small amount of quartz in the bauxite to be minimised and it also allows for solid/liquid separation before significant quantities of sodium alumino-silicate solids have formed in the digestion step.

U.S. Pat. No. 4,614,641 in the name of Grubbs, assigned to Aluminum Company of America, describes a digestion process for gibbsitic bauxites. The bauxite is ground and separated into a coarse fraction and a fine fraction. The fine fraction is subjected to a low temperature digestion at 80 to 120° C. to produce a digestion solution containing some silica (greater than 1.8 g/l) but a significant proportion of the silica in the fine bauxite remains unconverted and unextracted. The product digestion solution also has a high alumina content (near saturation) and a caustic concentration of more than 240 g/l (as $Na_2CO_3$).

The coarse bauxite fraction is digested under higher temperatures and pressures. The mixture of solids and liquor resulting from digestion of the coarse fraction contains desilication product, which evidently precipitates in the high pressure digester. This mixture is then contacted with the clarified liquor containing some silica (up to 1.8 g/l) from the low temperature digestion (in either the high pressure digester or the clarifier line), and the overall mixture is subsequently clarified. The fine fraction liquor is desilicated by contacting the fine fraction liquor with the mixture of solid residue and liquor from the coarse fraction digestion. The overall process is based upon the differences between the rates of dissolution of gibbsite and kaolinite as a function of temperature and bauxite residence contact time. It is also noted that the caustic solution used to contact the fine fraction digests substantially all of the gibbsitic alumina, from the fine fraction of the bauxite, and most of the silica remains undigested. Accordingly, this solution must initially have a low alumina content (before contacting the fine fraction of bauxite).

4) Sinter Process

This is an alternative to the Bayer process, commonly used in Chinese and Russian refineries for treatment of very high silica bauxites or non-bauxitic ores such as nepheline. A general description of sinter technology is given in a paper by B. I. Arlyuk and A. I. Pivnev in Light Metals 1992, pages 181 to 195. The ore is calcined with soda and lime under conditions where the products are sodium aluminate and calcium silicate. This mixture is then rapidly leached in water or spent liquor to recover the soda and alumina. During leaching some of the calcium silicate also dissolves leading to very high silica contents in the leach liquor (up to 15 g/l). This liquor is subsequently desilicated prior to precipitation of alumina. The leaching conditions are set to minimise silica dissolution and conversion to desilication product so only a small fraction is taken up.

In summary, in prior art processes for dealing with the problems of high silica feeds to the Bayer process either:

the bulk of the silica is chemically combined with high usage of reagents such as lime or soda, and deported as solid alkali and alkaline earth silicates into a general mud residue (containing many other contaminants and having poor handling characteristics) from which chemical values cannot easily be recovered, or by use of very short contact times a limited fraction of the non quartz silica is deported unconverted to residue, thereby reducing by this fraction caustic consumption in the formation of sodium aluminosilicate reporting to mud residue, but only where this silica is contained in a gibbsitic bauxite or bauxite fraction, or a limited fraction of the silica is taken into solution, and after separation of liquor from mud residue, is precipitated from liquors as a clean aluminosilicate, facilitating the recovery of chemical values from aluminosilicate via subsequent techniques.

All of the prior art processes suffer from one or more disadvantages. In particular, there is no prior art process which results in the substantial avoidance of economically significant reagent consumption due to silica in Bayer feeds, or which facilitates the substantial deportment of silica in Bayer feeds into separable clean streams from which chemical values can be easily recovered.

SUMMARY OF THE INVENTION

After carefully reviewing the prior art, the present inventors have established the need to develop an economically effective process which is capable of transferring a large proportion of the reactive silica in bauxite directly into solution for a period sufficient to enable a solid liquid separation to be carried out. The silica could then be recovered as a clean product for sale or further processing. It is an object of the present invention to provide such a process.

The present inventors have now proposed a process which meets this need, for which prior art processes have proved to be deficient.

In general, the present invention provides a process for removing silica from bauxite including the steps of mixing bauxite with a caustic liquor to form a mixture and to dissolve at least a substantial part of the reactive silica from the bauxite, said caustic liquor having a high caustic concentration, and separating the mixture into a solids containing component and a liquor having a high alumina content and containing a high level of dissolved silica.

In more specific terms, the present invention provides a process for the removal of reactive silica from feedstocks to the digestion step of the Bayer process for the manufacture of alumina comprising the following steps:

(a) contacting the Bayer process feedstock with a caustic liquor under the following process conditions which result in dissolving and stabilising at least 50% of the silica into solution at a level of at least 3 gpL and without significant precipitation from solution of the dissolved silica:
  (i) process exit liquor composition:
    caustic strength (as $Na_2CO_3$) greater than 250 gpL
    alumina concentration (as $Al_2O_3$) greater than 125 gpL.
  (ii) temperature: 60° C. –125° C.;
  (iii) contact time: greater than 20 minutes; and
(b) separating the silica bearing liquor from the solid residue of silica dissolution step (a) under conditions which do not promote significant precipitation of the silica.

The key requirements of the process of the present invention are use of a liquor having a high caustic concentration to allow rapid solubilisation of reactive silica and a high alumina concentration to stabilise a high level of silica in solution for a period of time sufficient to effect a solid/liquid separation. Advantageously, a low temperature is used to avoid accelerating precipitation of sodium aluminosilicate prior to solid/liquid separation.

The present inventors have surprisingly found that contacting bauxite containing reactive silica with a caustic liquor containing a high caustic concentration and a high alumina content can result in a substantial part of the reactive silica in the bauxite going into solution to a high concentration (typically between 7 and 15 g/l). Moreover, unlike prior art processes, in which sodium alumino-silicate begins to precipitate after a relatively short time, the process of the present invention can result in the dissolved silica remaining in solution for appreciable periods of time, for example, in excess of 2 hours, whilst also avoiding precipitation of sodium alumino-silicate on the solids component. This allows adequate time to both dissolve the silica and separate the silica containing liquor from the bauxite, a separation that could not be achieved at these levels of silica in solution by prior art processes.

In a preferred embodiment, the present invention further includes treating the liquor containing dissolved silica after separation from the solids to recover a solid desilication product therefrom. As the liquor containing dissolved silica is separated from the solids component prior to treating the liquor to recover the desilication product therefrom, the desilication product may be recovered as a clean siliceous product that may be further processed for caustic recovery or other purposes, or sold. The solid desilication product may be any aluminosilicate known to be capable of precipitating from caustic liquors by adjustment of temperature, liquor strength and composition, additives or seed. The ability to do further processing of a clean siliceous product without the complications associated with other typical red mud components gives several advantages, including the ability to closely control the chemistry in subsequent processing because the feed would be consistent in composition, and the ability to produce a range of clean siliceous products.

In an especially preferred embodiment, the process comprises a silica dissolution process which removes a substantial part of the reactive silica from the bauxite prior to subjecting the bauxite to Bayer process digestion. In this embodiment, the solids containing component from the silica dissolution step is subsequently fed to a Bayer process digestion step to extract alumina therefrom. Accordingly, it is preferred that contact of the bauxite with caustic solution in the silica dissolution process of the present invention is conducted such that dissolution of alumina from the bauxite into solution is minimised. It is important to note that the failure to use high alumina liquors in the process can result in premature and uncontrolled precipitation of sodium alumino-silicate. For this reason, solutions with significant capacity to uptake alumina at the temperatures of the process should be avoided.

Minimisation of alumina dissolution in the silica dissolution process results from using a caustic liquor having a high dissolved alumina content. The preferred caustic liquor for use in the silica dissolution process comprises either a pregnant liquor or a caustic liquor at close to saturation with alumina. Such liquors have limited capacity to dissolve any further alumina at the temperatures proposed for the novel process, thus ensuring that minimal alumina will dissolve from the bauxite.

The liquor containing dissolved silica from the silica dissolution process contains more than 3 g/l silica in solution, preferably 6 g/l to 15 g/l dissolved silica in solution.

The step of contacting the bauxite with the caustic liquor results in more than 50%, preferably more than 80%, and more preferably more than 90% of the reactive silica in the bauxite going into solution.

The contact time of the bauxite and the liquor is at least 20 minutes, preferably at least 1 hour, more preferably 2 to 4 hours. These figures are significantly higher than the silica dissolution and stability levels reported in any prior art.

The process can be tailored to suit subsequent Bayer digestion processes. For example, sufficient silica can be left with the bauxite residue to seed liquor desilication through digestion, so minimising scale build up.

The caustic liquor used in the silica dissolution process of the present invention has a high caustic concentration of greater than 250 g/l, preferably greater than 300 g/l, more preferably greater than 350 g/l, calculated as $Na_2CO_3$ (throughout this specification, all caustic concentrations are calculated as $Na_2CO_3$ unless otherwise specified).

The caustic liquor in the process also has a high dissolved alumina content of greater than 125 g/L, preferably greater than 150 g/l, more preferably greater than 175 g/l (calculated as $Al_2O_3$).

The operating temperature of the process of the present invention is within the range of 60° C. to 125° C., preferably within the range of 80° C. to 105° C. In the preferred temperature range, the temperature is below the atmospheric boiling point of the liquor and thus the need to use a pressure vessel for silica dissolution may be avoided. If temperatures substantially above the upper limit of the preferred range are used, the risk of spontaneous formation of sodium alumino-silicate DSP increases. For this reason, the temperature preferably is maintained below 125° C.

The liquor fed to the silica dissolution step preferably has a low dissolved silica content, for example, less than 2 g/L dissolved silica. More preferably, the dissolved silica content of the feed liquor is less than 1 g/L.

The solids loading of the bauxite/caustic liquor mixture preferably falls within the range of 50 g/L to 700 g/L, which corresponds to a weight percentage of solids in the mixture of 5 to 60%.

The present inventors believe that the process of the present invention will be effective in removing silica from bauxite using conditions outside the preferred ranges given above. In particular, lower caustic concentrations may be used. However, the extraction of silica from the bauxite may be lowered if operating conditions outside the preferred ranges are used.

The present invention provides a process for removing silica from bauxite that may allow for substantially complete removal (certainly in excess of 80% removal) of reactive silica from the bauxite. Moreover, the dissolved silica stays in solution for sufficient time to enable solid/liquid separation to take place without substantial precipitation of sodium alumino-silicate on the bauxite.

As indicated above, the present inventors believe that the key to this process is using a caustic liquor having a high caustic concentration and a high content of dissolved alumina. This is a surprising result because the sodium alumino-silicate that forms in a desilication step is a sodium alumino-silicate solid product.

Prior to the present disclosure there was no reason for a person skilled in the art to suspect that the stable supersaturation level of silica will increase with increasing solution alumina content. The alumina content of the liquor stabilises silica into solution for useful times in the context of solid/liquid separation at levels which can exceed the solubility level by several times the solubility limit.

In view of the results obtained from experimental work on the present invention, the inventors have postulated that the presence of dissolved alumina in the caustic liquor assists in stabilising the reactive silica into solution by formation of complexes with aluminium species in solution.

The deficiencies of prior art compared to our process are summarised below:

1) For conventional predesilication processes, in which silica is deliberately fully converted to aluminosilicate desilication product the maximum dissolved silica levels are low (normally well less than 50% of the available silica is in solution at any point) and solution stability times are short. Therefore, the extraction of silica from bauxite is low (and subsequent solid/liquid separation is normally not practised).

2) For low temperature digestion processes, aimed at avoiding some silica conversion to sodium bearing compounds and applicable only to gibbsitic bauxites, high dissolved silica levels are not maintained for any useful time.

3) For double digestion processes, the problems associated with conventional predesilication and low temperature digestion are not avoided, and there is no other benefit which would assist in the treatment of high silica bauxites.

4) For sinter processes, maximum dissolved silica levels are high, but still represent only a small fraction of total silica in bauxite. Also, the bauxite requires pretreatment (roasting with additives), and is generally thought to be uneconomic for future alumina developments.

BRIEF DESCRIPTION OF THE DRAWINGS

Preferred embodiments of the invention will now be described with reference to the accompanying drawings in which.

DESCRIPTION OF THE PREFERRED EMBODIMENTS

Figure 1:
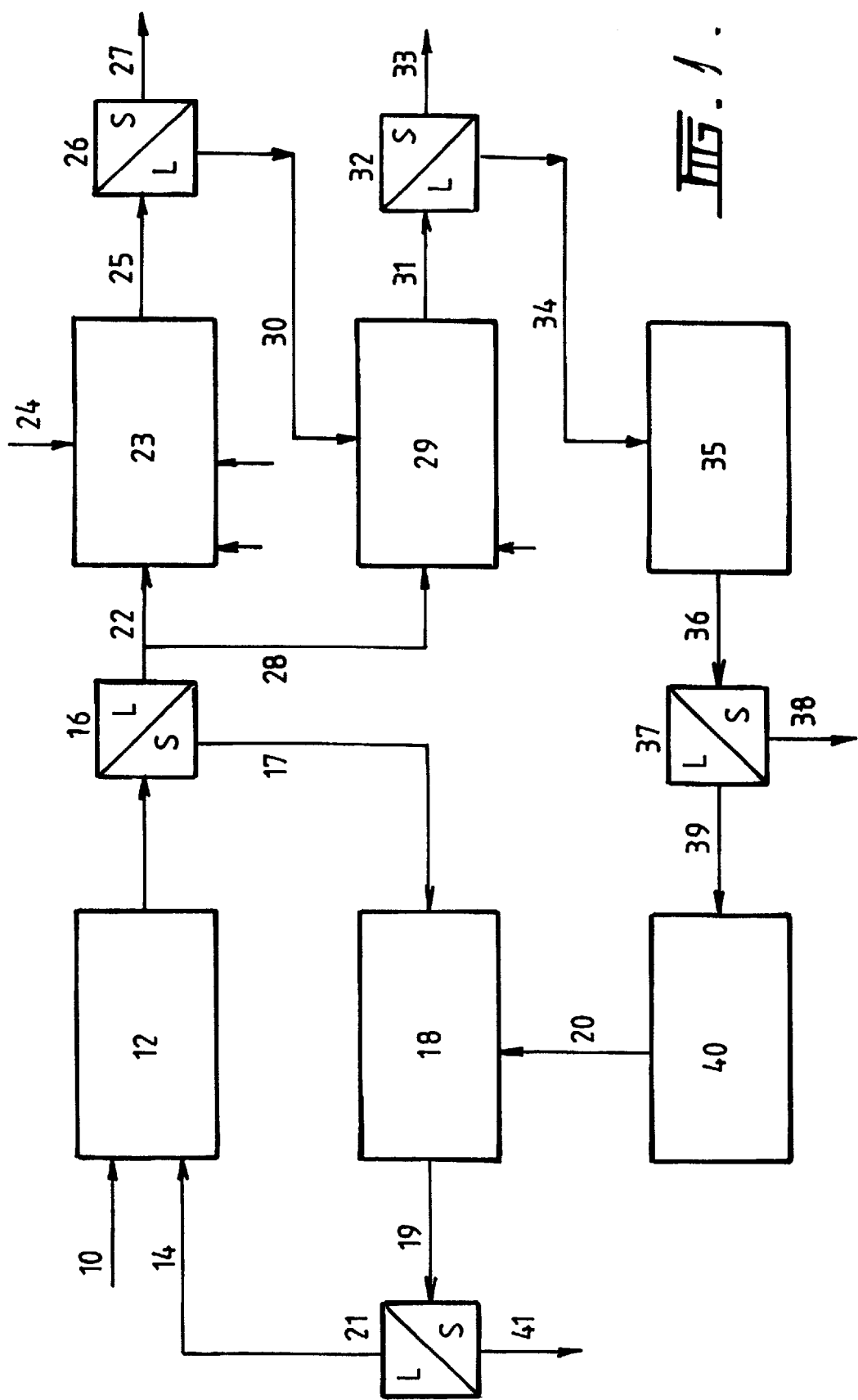
FIG. 1 is a schematic flow diagram showing one process embodying the invention.

In the process of FIG. 1, bauxite 10 is supplied to a silica dissolution vessel 12 where the bauxite 10 is mixed with pregnant liquor 14 from the bauxite digestion step. In silica dissolution vessel 12, the pregnant liquor 14 acts to dissolve a substantial portion, for example, approximately 90%, of the reactive silica from the bauxite. After a suitable residence time, closely controlled to minimise the formation of sodium alumino-silicates, the mixture from vessel 12 passes to solid liquid separator 16. The solids containing component 17 passes to a digester 18 where the desilicated bauxite is contacted with spent liquor 20 to digest alumina therefrom. It will be appreciated that digestion step 18 may comprise a single digestion or a double digestion, depending upon the bauxite type being used. After bauxite digestion, the slurry is transferred via line 19 to a solid/liquid separator 21 where pregnant liquor 14 is separated from red mud 41.

The liquor 22 from solid/liquid separation 16 contains dissolved silica and is preferably treated to remove silica therefrom. This may be achieved by treating the liquor 22 in silica precipitation vessel 23. In this vessel, liquor 22 is reacted, e.g. mixed with water and possibly reagents 24 (and preferably seed material), possibly with heating, and a desilication product is formed. The result in precipitation slurry 25 is sent to solid liquid separator 26 and a desilication product 27 is recovered. Liquor 22 may also include a side stream 28 that is sent to a final silica precipitation vessel 29. Liquid 30 from solid/liquid separator 26 may also be fed to final silica precipitation vessel 29. In this vessel, a sodalite sodium alumino-silicate seed is added to result in the precipitation of a sodalite sodium alumino-silicate. The resulting precipitation slurry 31 is fed to a solid liquid separator 32 and a precipitated product 33 is recovered. The liquor 34 is desilicated pregnant liquor and it is passed to alumina precipitation circuit 35 that may comprise any suitable process for precipitating alumina by the Bayer process. The precipitation slurry 36 is classified in classifier 37 in accordance with known Bayer process techniques. The alumina trihydrate 38 recovered from the classifier includes product trihydrate as well as seed trihydrate for return to the precipitation circuit. The spent liquor 39 is passed to evaporator 40 for concentration to a suitable level for use in bauxite digestion and it is then passed as spent liquor stream 20 to bauxite digester 18.

It will be appreciated that the flow sheet shown in FIG. 1 may be susceptible to one or more modifications. In particular, the process may do without dilute silica precipitation vessel 23 or silica precipitation vessel 29. Furthermore, pregnant liquor stream 14 may be only partially fed to silica dissolution vessel 12. For example, pregnant liquor stream 14 may be split with only part of the pregnant liquor being fed to silica dissolution vessel 12 and part being fed to alumina precipitation circuit 35.

Figure 2:
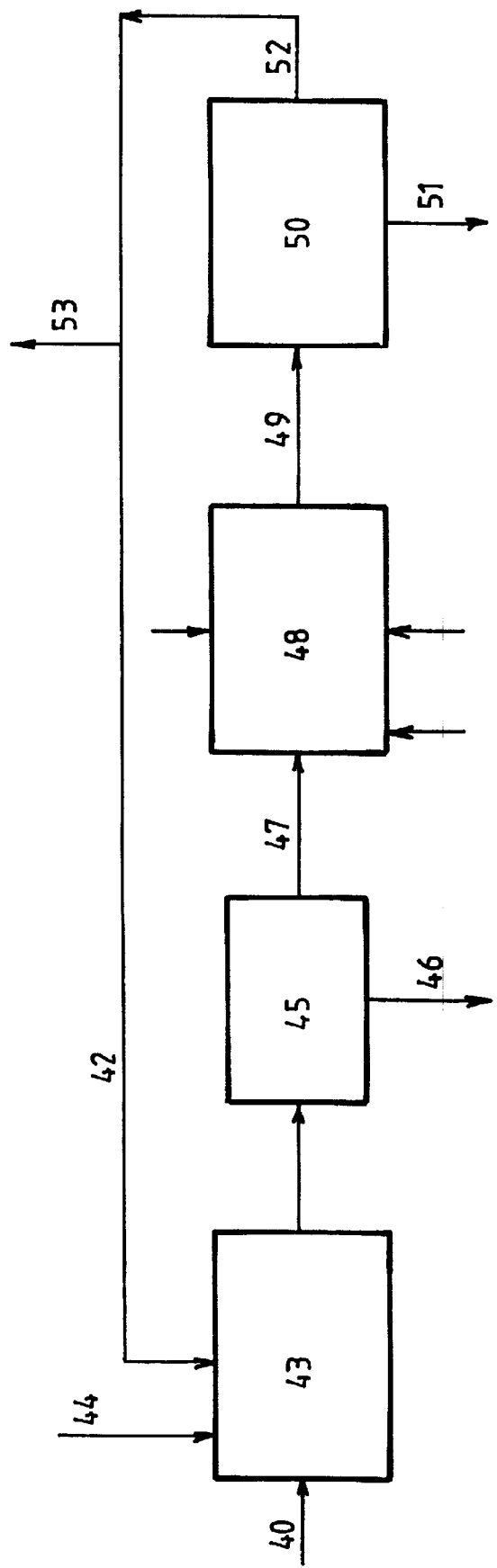
FIG. 2 is a schematic flow diagram showing another process embodying the invention.

FIG. 2 shows an alternative circuit to that shown in FIG. 1. In FIG. 2, bauxite 40 and recycled caustic liquor 42 having a high caustic concentration and a high dissolved alumina content are mixed in silica dissolution vessel 43. Any make up additives that may be required are added through line 44. The mixture from vessel 43 is sent to phase separator 45 where the solids component 46 is separated therefrom and sent to the Bayer digestion process. The liquor 47 containing dissolved silica is sent to silica precipitation vessel 48 where a solid desilication product may be precipitated, for example, by heating the liquor or by diluting the liquor, preferably with seed and possibly other additives. The precipitation slurry 49 is sent to settler 50 where a clean desilication product 51 is recovered therefrom for sale, or further treatment to recover caustic therefrom. The liquor 52 flows into recycle stream 42. A bleed to a Bayer precipitation process 53 may also be incorporated into this stream.

It will be appreciated that the flowsheet of FIG. 2 will ensure that the liquor which circulates between silica dissolution and precipitation has a high alumina content, as it will stabilise to a steady state composition which reflects the solubility of the bauxite alumina bearing phases.

Finally, throughout this specification, reference is made to alumina in solution. Dissolution of alumina in caustic liquors results in the formation of sodium aluminate and it will be understood that references to alumina in solution or dissolved alumina include sodium aluminate within this scope.

EXAMPLES

The bauxite used in these examples was a high silica blended Weipa bauxite, milled to passing 0.5 mm, having the following composition (in weight percentage of the components):

| $Al_2O_3$ | $Fe_2O_3$ | $SiO_2$ | $TiO_2$ | $ZrO_2$ | $SO_3$ | $Na_2O$ | LOI | Sum | quartz |
|---|---|---|---|---|---|---|---|---|---|
| 55.5 | 11.8 | 5.8 | 2.6 | 0.1 | 0.2 | 0 | 24.4 | 100.6 | 1.4 |

Figure 3:
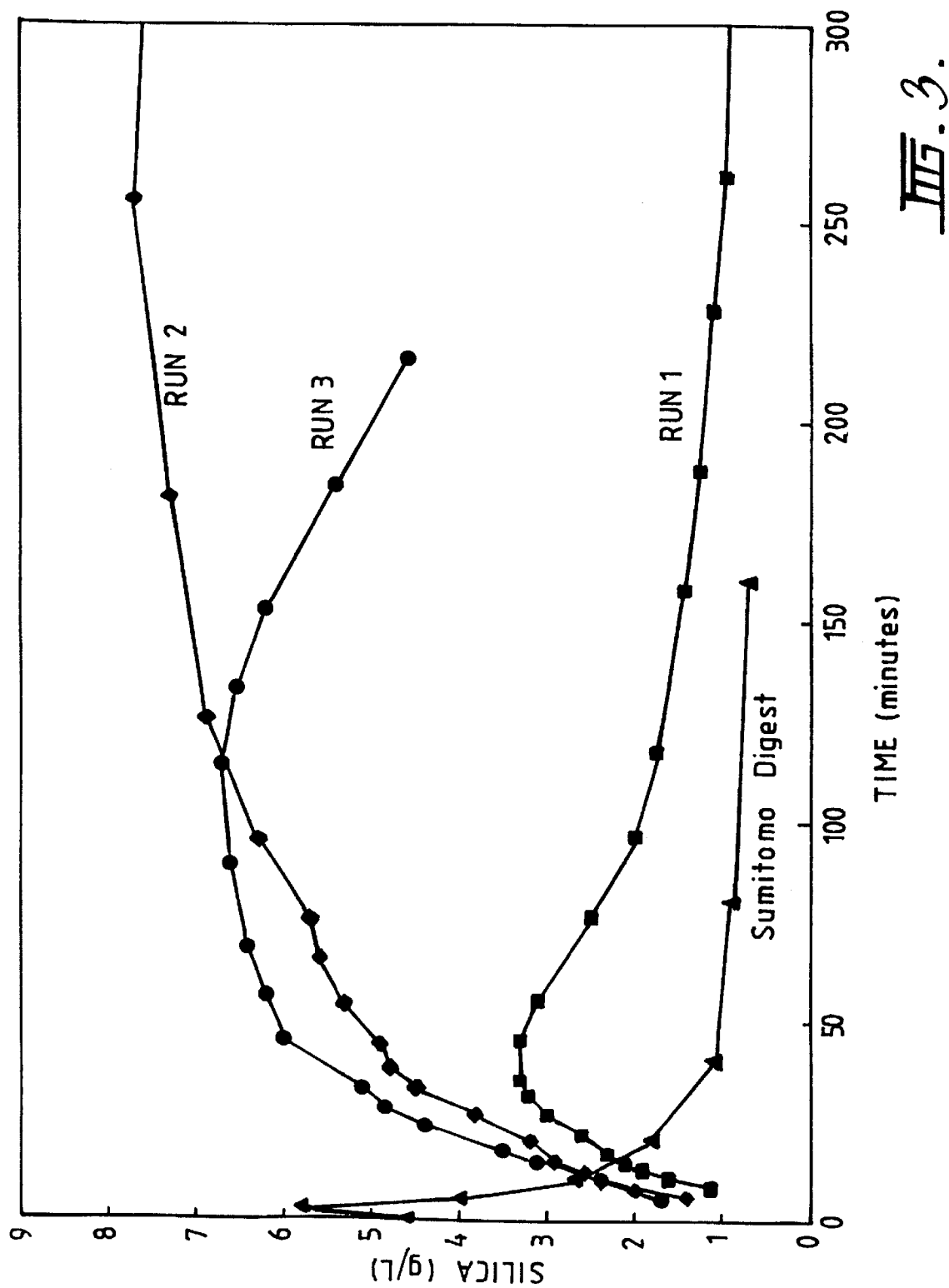
FIG. 3 is a graph showing silica concentration versus time for several different digestion processes.

FIG. 3 is a graph showing silica concentration against time for several different digestion processes, including the process according to the invention (run 2 and run 3).

Table 1 summarises the experimental conditions for the testwork whose results are presented in FIG. 3.

The experiments were carried out in batch mode. The liquor composition is expressed according to both alumina industry convention and chemical composition. The values are for the starting liquor. The composition changed slightly during the runs, in particular the alumina concentrations increased by up to about 40 gpL.

Run 1 was conducted under conditions relevant to a conventional predesilication process in which the silica concentration increased to a value of the order of 3 gpL, corresponding to less than about one third of the reactive silica in the bauxite, then decreased as desilication product (sodium alumino-silicate) precipitates. This result does not represent adequate extraction of silica, especially given that in many such processes the starting liquor will not be free of silica. In addition, the solution was not sufficiently stable to ensure that solid liquid separation can be effective in ensuring good extraction of silica.

TABLE 1

Test Conditions For The Results of FIG. 3.

| | Run 1 | Run 2 | Run 3 | Sumitomo digest |
|---|---|---|---|---|
| Temperature | 95° C. | 95° C. | 95° C. | 130° C. |
| Bauxite charge | 200 g/l | 200 g/l | 200 g/l | 190 g/l |
| Liquor Composition | | | | |
| Caustic soda (CS) (g/l $Na_2CO_3$) | 250 | 400 | 400 | 260 |

TABLE 1-continued

Test Conditions For The Results of FIG. 3.

| | Run 1 | Run 2 | Run 3 | Sumitomo digest |
|---|---|---|---|---|
| alumina to caustic ratio (A/C) | 0.4 | 0.6 | 0.4 | 0.32 |
| caustic to soda ratio (C/S) | 0.85 | 0.98 | 0.98 | 0.85 |
| [NaOH] g/l | 189 | 302 | 302 | 196 |
| [$Al_2O_3$] g/l | 100 | 240 | 160 | 83.2 |
| [$Na_2CO_3$] g/l (carbonate) | 44 | 8 | 8 | 46 |

The line in FIG. 3 labelled "Sumitomo Digest" shows the silica profile obtained for a simulated digestion process according to some details of Sumitomo Patent Application WO93/20251. In this digestion process, the silica concentration reached a very rapid peak and equally rapidly dropped away to a low level of silica concentration. In this process it is extremely difficult, if not impossible, to control the process to the extent necessary to allow the separation of a high silica liquor from residual solids free of desilication product.

A comparison of the three curves helps to distinguish the present invention from prior art. With conventional pre-desilication (run 1), the maximum silica concentration in liquor only represents a small fraction (~30%) of the reactive silica in bauxite. With the Sumitomo type digestion, a large fraction of the silica in bauxite is dissolved, but the silica concentration is not maintained for any useful time.

In the graphs labelled run 2 and run 3, the process according to the invention is illustrated. In run 2, silica concentration increased continuously over about 4 hours, reaching a maximum of the order of 8 gpL, which represents approximately 90% of the reactive silica content of the bauxite sample. In run 3, the silica concentration reached a maximum of the order of 8 gpL and then decreased because of sodium alumino-silicate precipitation. However, high levels of silica were still maintained for greater than 2 hours.

Run 2 and run 3 illustrate the use of liquor of high alumina content and it will be noted that the high alumina and caustic concentrations have inhibited sodium alumino-silicate precipitation.

Since modifications within the spirit and scope of the invention may be readily effected by persons skilled in the art, it is to be understood that the invention is not limited to the particular embodiments described hereinabove or by way of the particular examples hereinabove.

It is also to be understood that there will be many possible physical arrangements, equipment designs and equipment configurations that may be applied in the operation of the proposed process. Persons skilled in the art will readily effect the use of equipment technology combinations and flowsheet schemes commonly applied in the chemical engineering and metallurgical industries, and in the Bayer process, in the application of the process described herein, by merely following normal processes of testwork to define optimum parameters for the specific circumstances under consideration and engineering design.

In the claims which follow and in the preceding description of the invention, the words "comprising" and "comprises are used in the sense of the word "including", ie the features referred to in connection with these words may be associated with other features that are not expressly described.

What is claimed is:

1. A process for the removal of reactive silica from a feedstock to the digestion step of the Bayer process for the manufacture of alumina, comprising the steps of:

(a) contacting the Bayer process feedstock with a caustic liquor under process conditions which result in dissolving and stabilizing at least 50% of the silica into solution at a level of at least 3 gpL and without significant precipitation from solution of dissolved silica, said process conditions comprising:
    (i) caustic liquor composition:
      caustic strength (as $Na_2CO_3$) greater than 250 gpL
      alumina concentration (as $Al_2O_3$) greater than 125 gpL;
    (ii) contact temperature with caustic liquor: 60° C.–125° C.;
    (iii) contact time with caustic liquor: greater than 20 minutes;
    to produce a silica bearing liquor and a solid residue;
  (b) separating the silica bearing liquor from solid residue of step (a) under conditions which do not promote significant precipitation of the silica; and
  (c) precipitating aluminosilicates from the separated silica bearing liquor from step (b), and forming a solid aluminosilicate product which is free of a majority of all other components of the feedstock.

2. The process defined in claim 1 wherein the silica dissolution step (a) results in dissolution of less than 20% by weight of alumina in the feedstock.

3. The process defined in claim 1 wherein the step of precipitating aluminosilicates includes at least one of the steps of addition of seed to the silica bearing liquor, heating the silica bearing liquor, diluting the silica bearing liquor, and adding additives to the silica bearing liquor.

4. The process defined in claim 1 wherein the process conditions of silica dissolution step (a) result in dissolving and stabilizing at least 80% of the silica into solution.

5. The process defined in claim 4 wherein the process conditions of silica dissolution step (a) result in dissolving and stabilizing at least 90% of the silica into solution.

6. The process defined in claim 1 wherein the level of dissolved and stabilized silica in dissolution step (a) is 6–15 gpL.

7. The process defined in claim 1 wherein the caustic strength of the caustic liquor (as $Na_2CO_3$) in silica dissolution step (a) is greater than 300 gpL.

8. The process defined in claim 7 wherein the caustic strength of the caustic liquor (as $Na_2CO_3$) is greater than 350 gpL.

9. The process defined in claim 1 wherein the alumina concentration of the caustic liquor (as $Na_2CO_3$) in silica dissolution step (a) is greater than 150 gpL.

10. The process defined in claim 9 wherein the alumina concentration of the caustic liquor (as $Al_2O_3$) in silica dissolution step (a) is greater than 175 gpL.

11. The process defined in claim 1 wherein the temperature of the silica dissolution step is 80° C.–105° C.

12. The process defined in claim 1 wherein the contact time of the silica dissolution step (a) is at least 1 hour.

13. The process defined in claim 12 wherein the contact time is 2–4 hours.

14. The process defined in claim 1 wherein the dissolved silica content of the caustic liquor supplied to the silica dissolution step is less than 2 gpL.

15. The process defined in claim 1 wherein the silica bearing liquor in silica dissolution step (a) has a solids loading of 50–700 gpL.

16. A process as defined in claim 1, wherein the feedstock comprises greater than 5% by weight boehmite or diaspore.

17. The process defined in claim 1 additionally comprising subjecting the solid residue obtained in step (b) to the Bayer process for digestion of bauxite contained therein.

* * * * *